(12) United States Patent
Blumenkrantz et al.

(10) Patent No.: US 6,225,792 B1
(45) Date of Patent: *May 1, 2001

(54) METHOD AND APPARATUS FOR THE SUPPLY OF ENERGY TO A HEARING DEVICE

(75) Inventors: Enrique Marcello Blumenkrantz, Neuchatel; Erik Witthoefft Rasmussen, Meilen, both of (CH)

(73) Assignee: Phonak AG, Stafa (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/313,440

(22) Filed: May 18, 1999

Related U.S. Application Data

(63) Continuation of application No. 08/771,482, filed on Dec. 23, 1996, now Pat. No. 5,907,235.

(51) Int. Cl.[7] .............................. G05F 1/10; G05F 1/652; G05F 1/44
(52) U.S. Cl. ........................ 323/222; 323/289; 323/284; 323/244
(58) Field of Search .................................. 323/222, 223, 323/244, 282, 283, 284, 285, 289, 290

(56) References Cited

U.S. PATENT DOCUMENTS

| | | | |
|---|---|---|---|
| 4,168,477 | 9/1979 | Burchall | 323/222 |
| 4,346,431 | 8/1982 | Steigerwald | 323/222 |
| 4,347,474 | 8/1982 | Brooks et al. | 323/224 |
| 4,616,303 | * 10/1986 | Mauthe | 363/60 |
| 4,672,303 | 6/1987 | Newton | 323/285 |
| 4,727,308 | 2/1988 | Huljak et al. | 323/287 |
| 4,736,151 | 4/1988 | Dishner | 323/224 |
| 4,792,886 | * 12/1988 | Sahm | 363/60 |
| 4,801,859 | 1/1989 | Dishner | 323/224 |
| 4,912,393 | * 3/1990 | Anderson et al. | 323/313 |
| 5,066,900 | 11/1991 | Bassett | 323/282 |
| 5,097,196 | 3/1992 | Schoneman | 323/224 |
| 5,146,395 | 9/1992 | McKie | 363/13 |
| 5,313,383 | 5/1994 | Ikeuchi | 323/222 |
| 5,350,997 | 9/1994 | Ghotbi et al. | 323/222 |
| 5,473,526 | 12/1995 | Svensson et al. | 363/60 |
| 5,719,528 | * 2/1998 | Rasmussen et al. | 330/10 |
| 5,907,225 | * 5/1999 | Blumenkrantz et al. | 323/222 |

* cited by examiner

Primary Examiner—Shawn Riley
Assistant Examiner—Bao Q. Vu
(74) Attorney, Agent, or Firm—Pearne & Gordon LLP

(57) ABSTRACT

The present invention relates to a method to generate at least a supply voltage to supply energy to a hearing device, whereas the ratio between the supply voltage and the source voltage is adjustable. The hearing device substantially comprises a source (Q), at least a switching element (S1, ..., Sn), at least an energy transfer element (EUE), at least an energy storing element (ES), a load (Z) and a control unit (CTRL), whereas the method consists in that, in a first step, the control unit (CTRL) acts on the switching elements (S1, ..., Sn), such that energy is transferred from the source (Q) to the energy transfer elements (EUE), that, in a second step, the control unit (CTRL) acts on the switching elements (S1, ..., Sn), such that at least a part of the energy stored in the energy transfer elements (EUE) is transferred to the energy storing elements (ES) to build a supply voltage across the load (Z).

6 Claims, 9 Drawing Sheets

METHOD AND APPARATUS FOR THE SUPPLY OF ENERGY TO A HEARING DEVICE

CROSS REFERENCE TO RELATED APPLICATION

The present application is a continuation of application Ser. No. 08/771,482, now U.S. Pat. No. 5,907,235, which was filed on Dec. 23, 1996.

The present invention relates to a method according to the precharacterizing part of claim 1 as well as to an apparatus to use this method.

In hearing devices, batteries are almost exclusively used as electrical energy sources. Thereby, exactly adjustable and stable supply voltages are required in order for a hearing device to fulfil its task error-free. Furthermore, several values for supply voltages which deviate from the battery voltage are often necessary and which values, sometimes, must be larger than the battery voltage itself.

To generate a higher supply voltage than the source voltage, i.e. the battery voltage, the use of a so-called voltage multiplication circuit is known. Nevertheless, such a circuit comprises the disadvantage that only integer multiple of the source voltage can be generated. Thereby, the conditions demanded by hearing devices cannot be fulfilled. In addition, it is of great importance for power line independent devices to sparingly use the energy which is available. Furthermore, the expenditure for the circuit should be kept low. In addition, the changes of the battery voltage depending on influences of age or of the outside have to be observed, since just these changes are the cause of low voltage precision, especially when using voltage multiplication circuits for a voltage increase.

The object of the present invention is therefore to provide a method to generate constant and stable supply voltages.

This will be reached by the measures given in the characterizing part of claim 1. Further embodiments of the present invention as well as an apparatus are given in further claims.

The present invention comprises the following advantages: Starting from a battery voltage which may change on grounds of age or in dependence on the load, a stable supply voltage is generated the value of which may also be greater than the battery voltage. If need be, the present invention may also be used to generate several supply voltages of different values. The present invention can especially be used for the integration on a micro chip which is especially important when using it for a hearing device.

Figure 1:
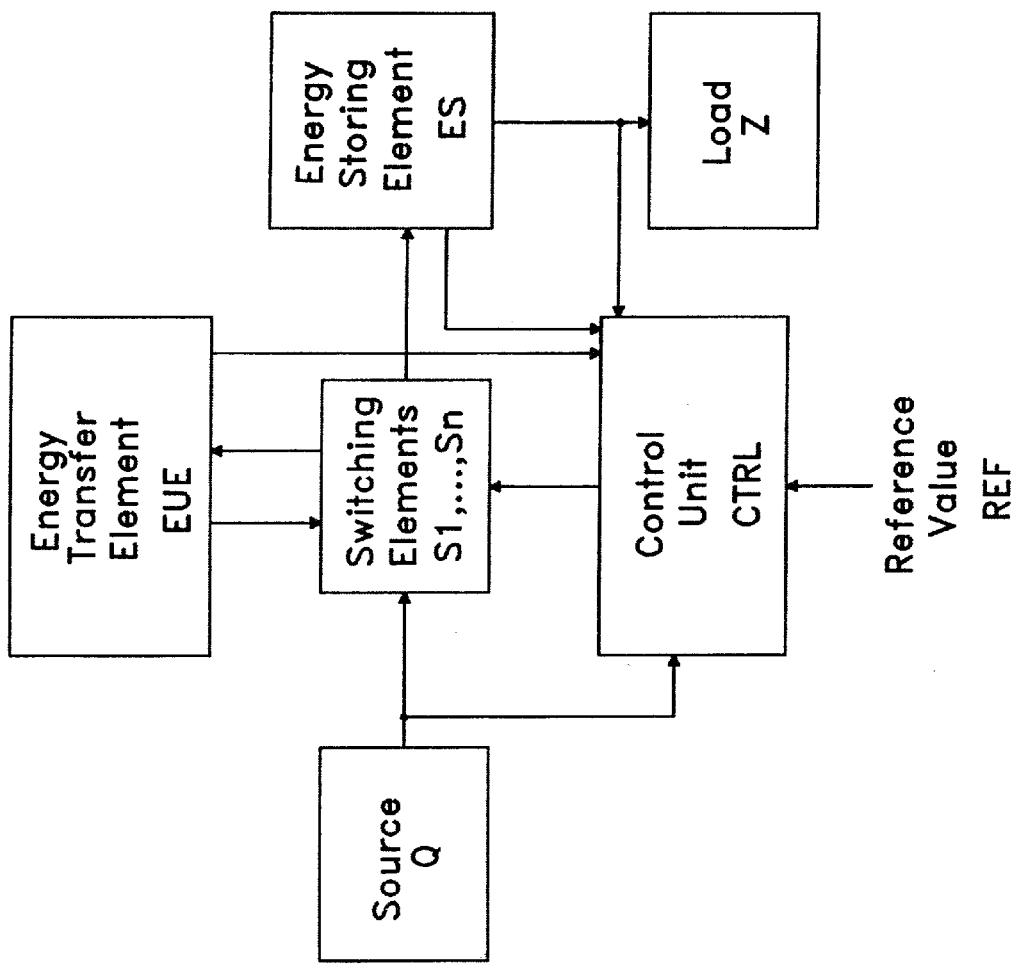
Figure 2:
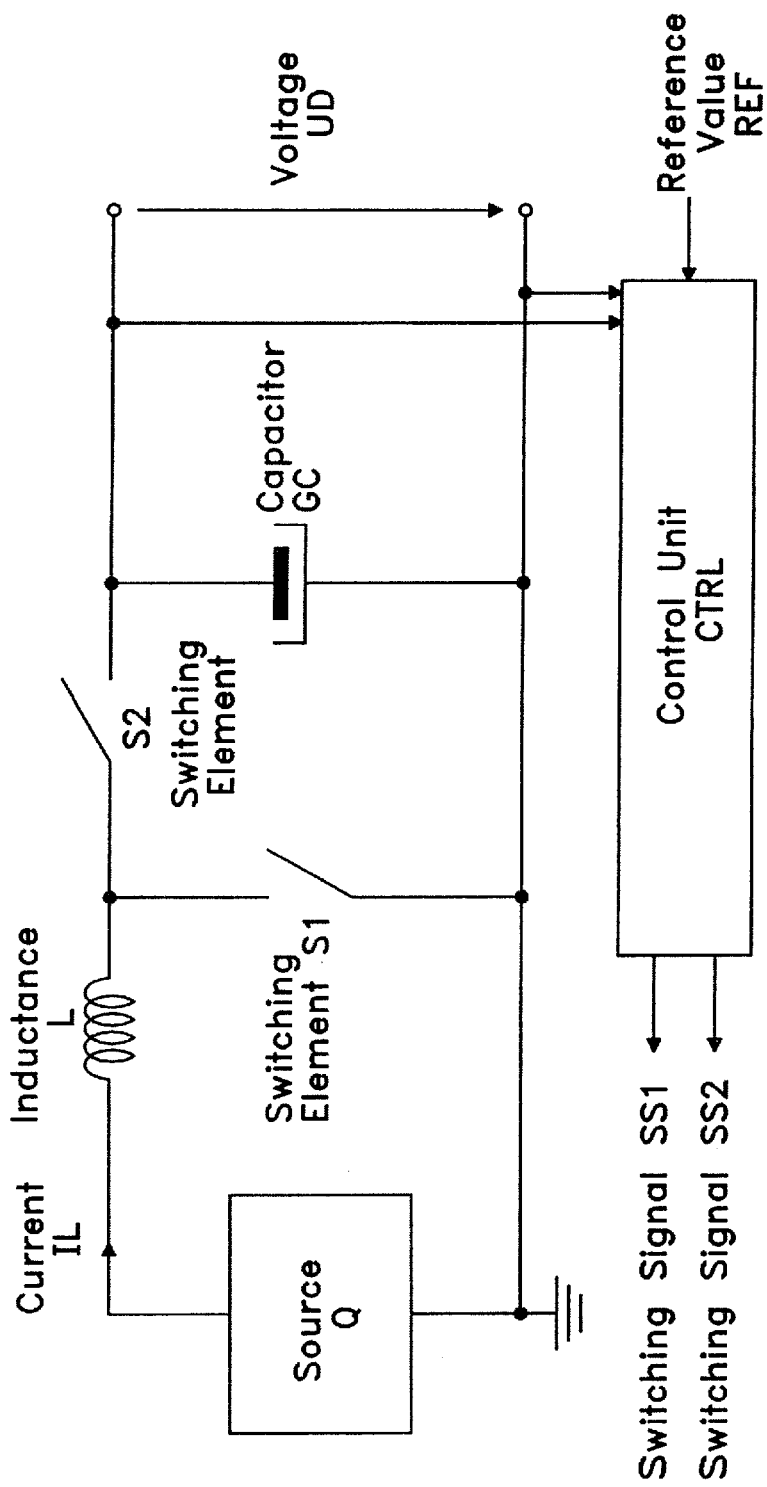
Figure 3:
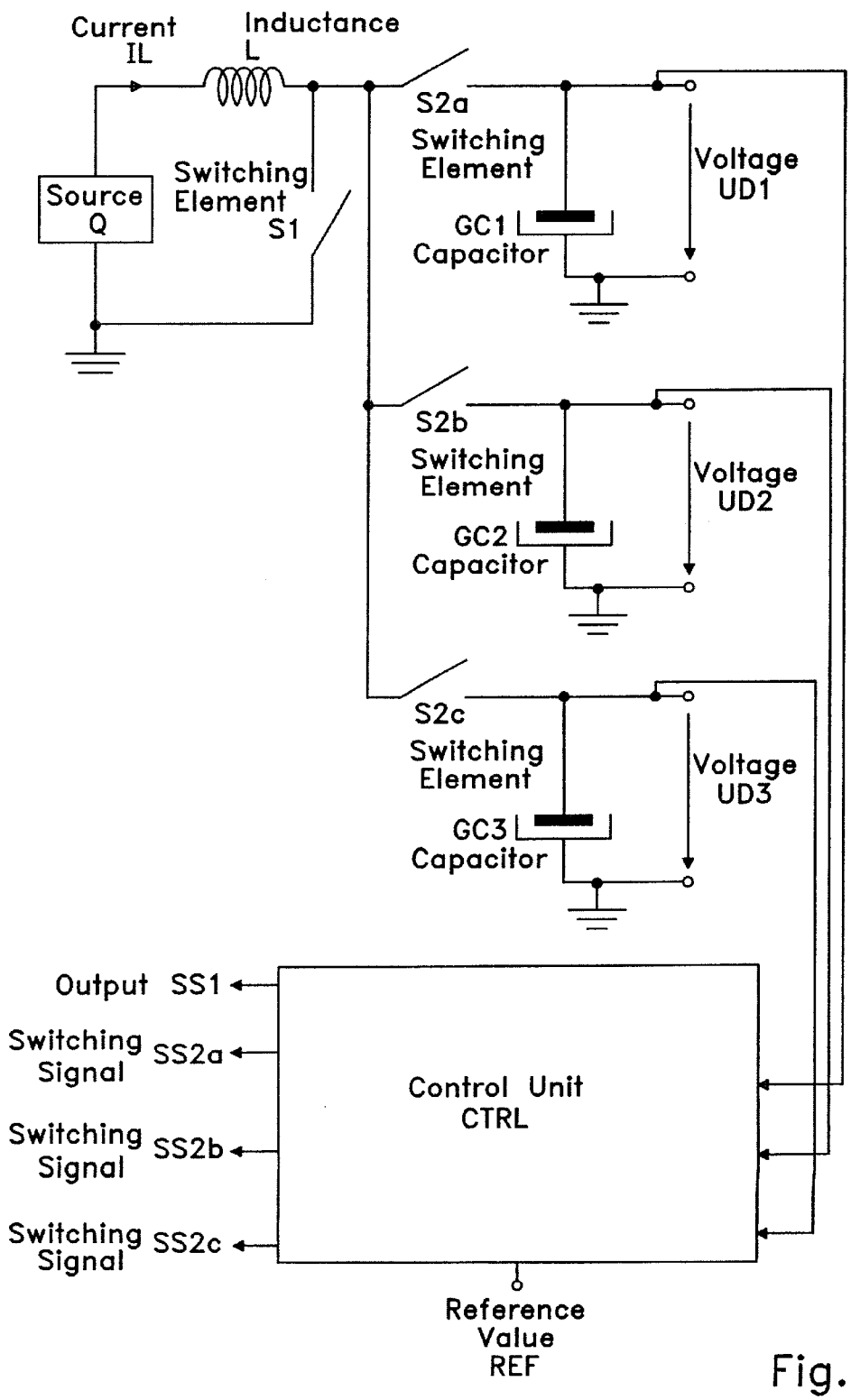
Figure 4:
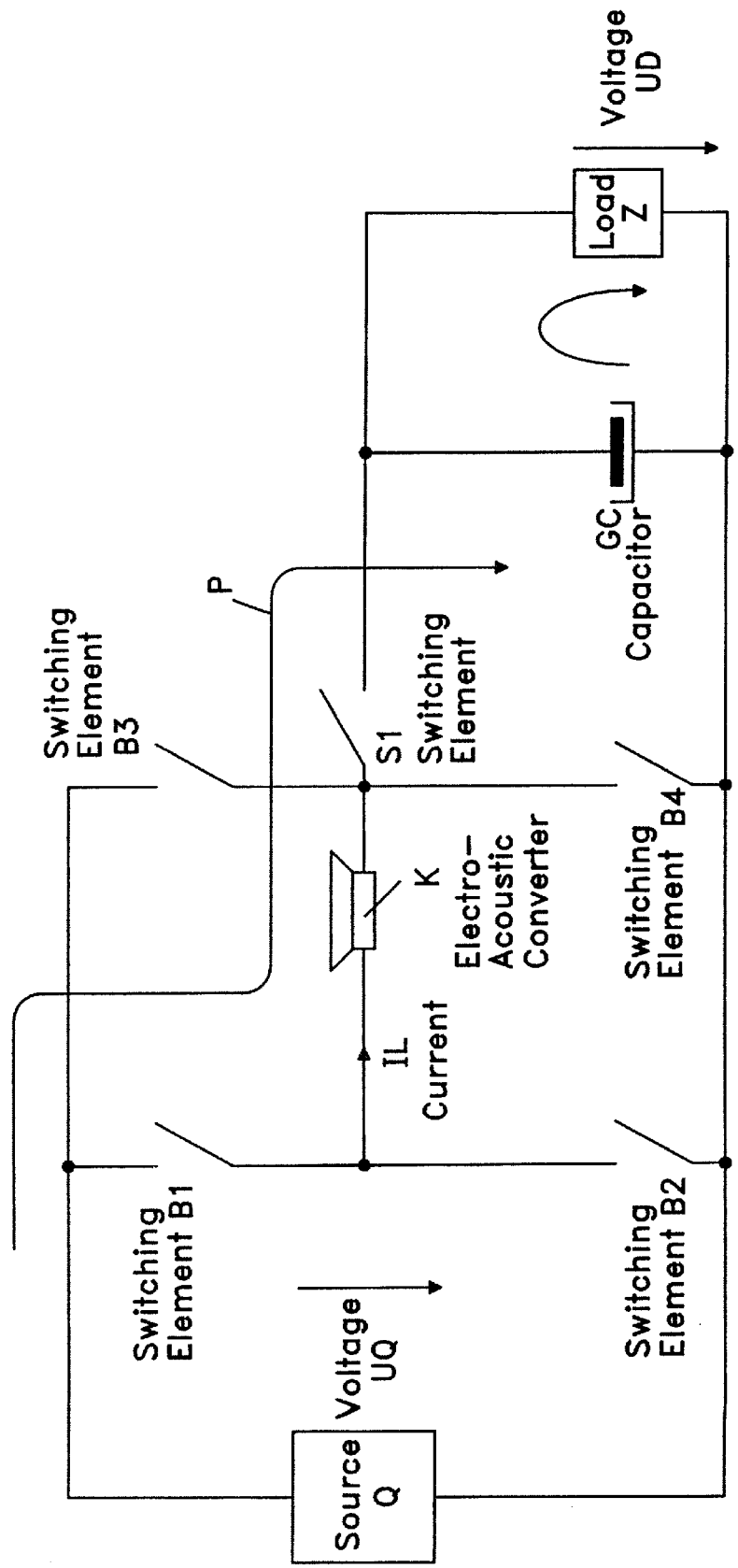
Figure 5:
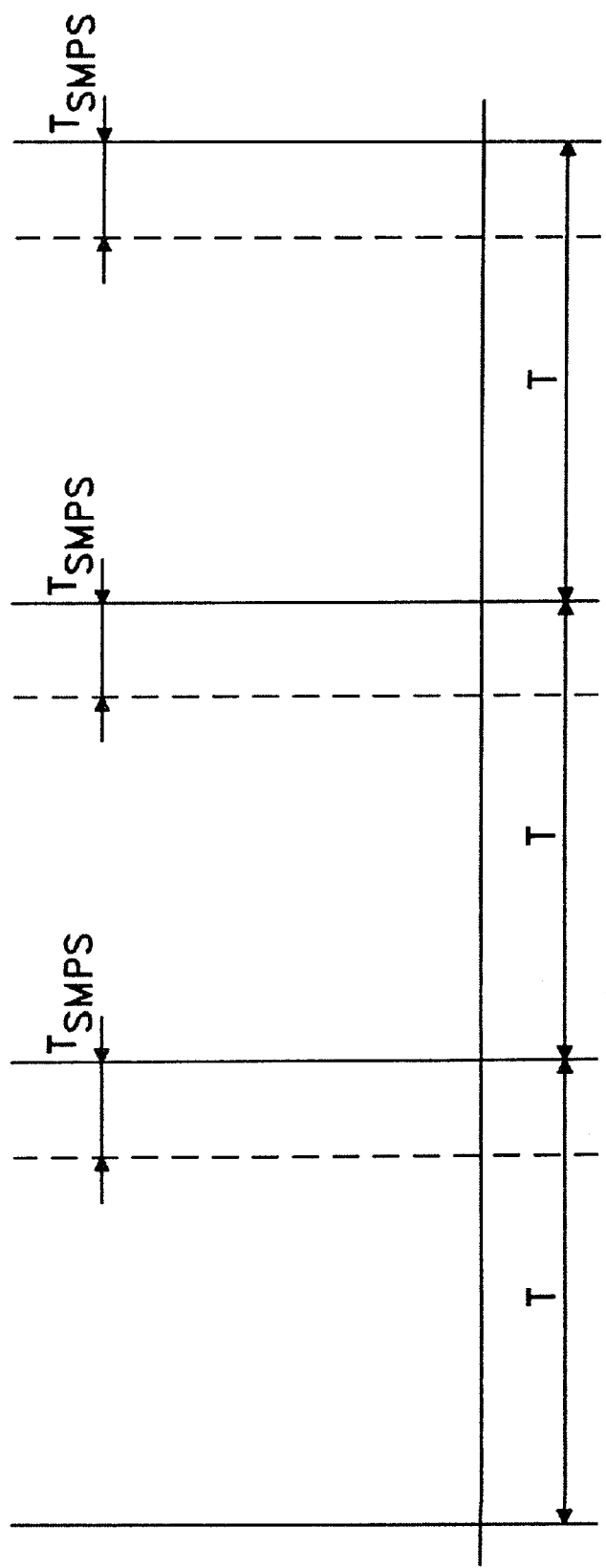
Figure 6:
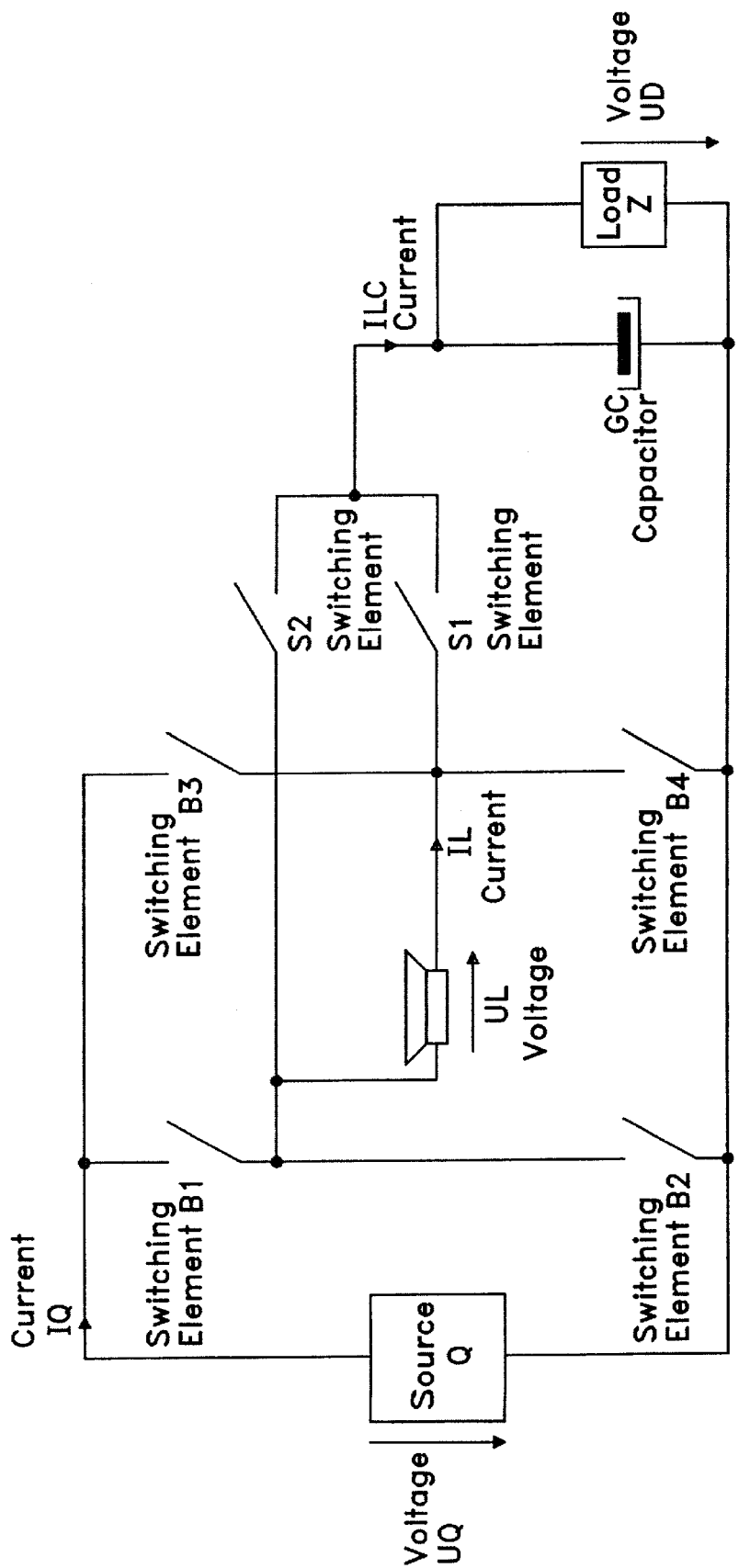
Figure 7:
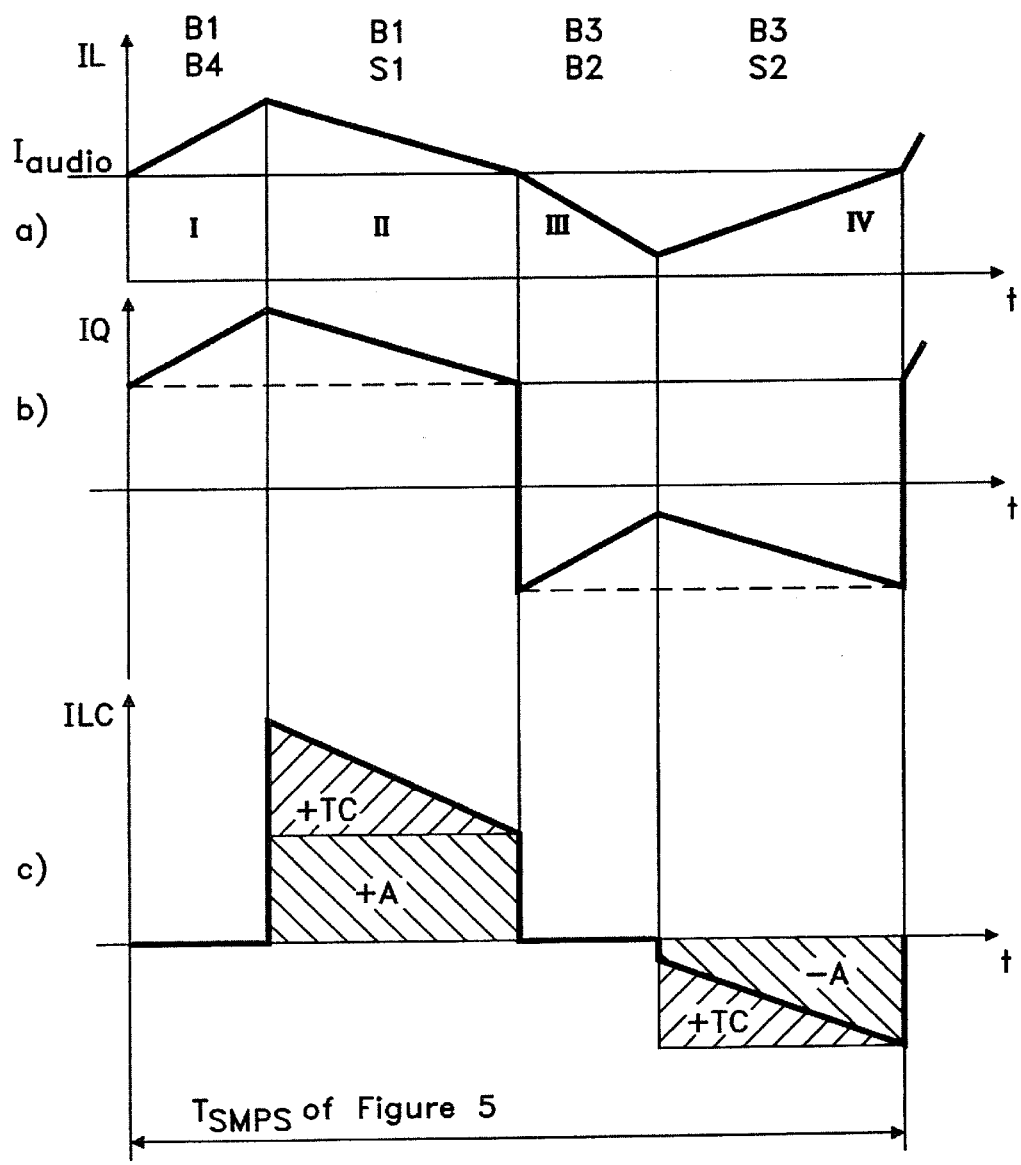
Figure 8A:
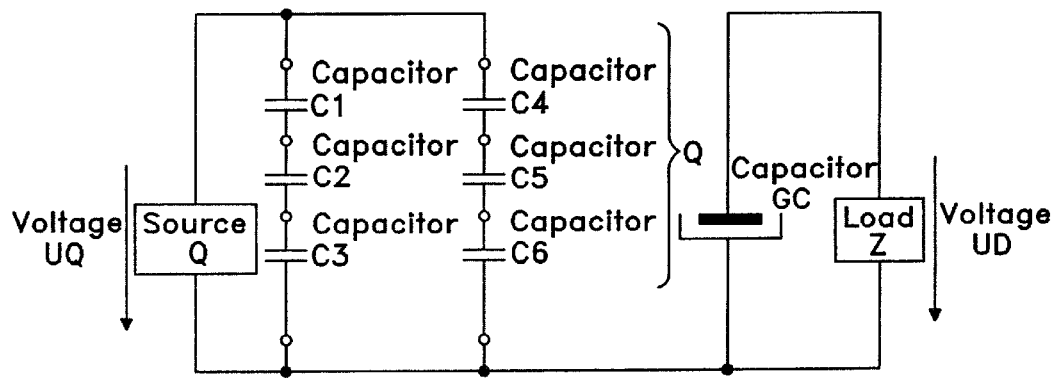
Figure 8B:
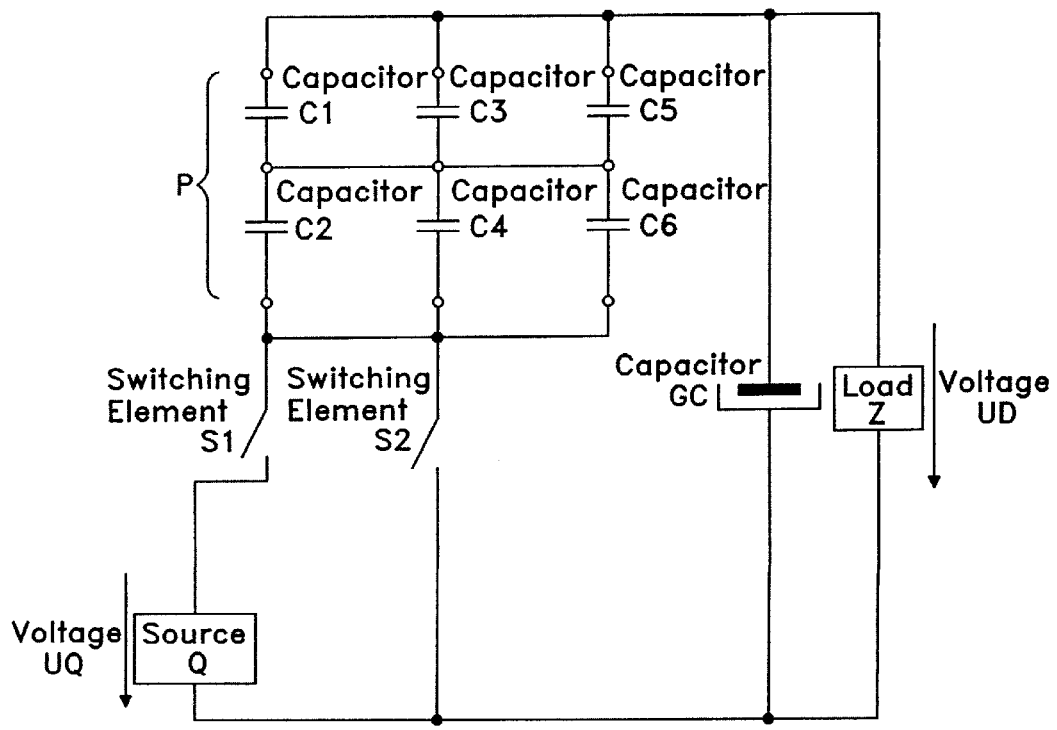
Figure 9:
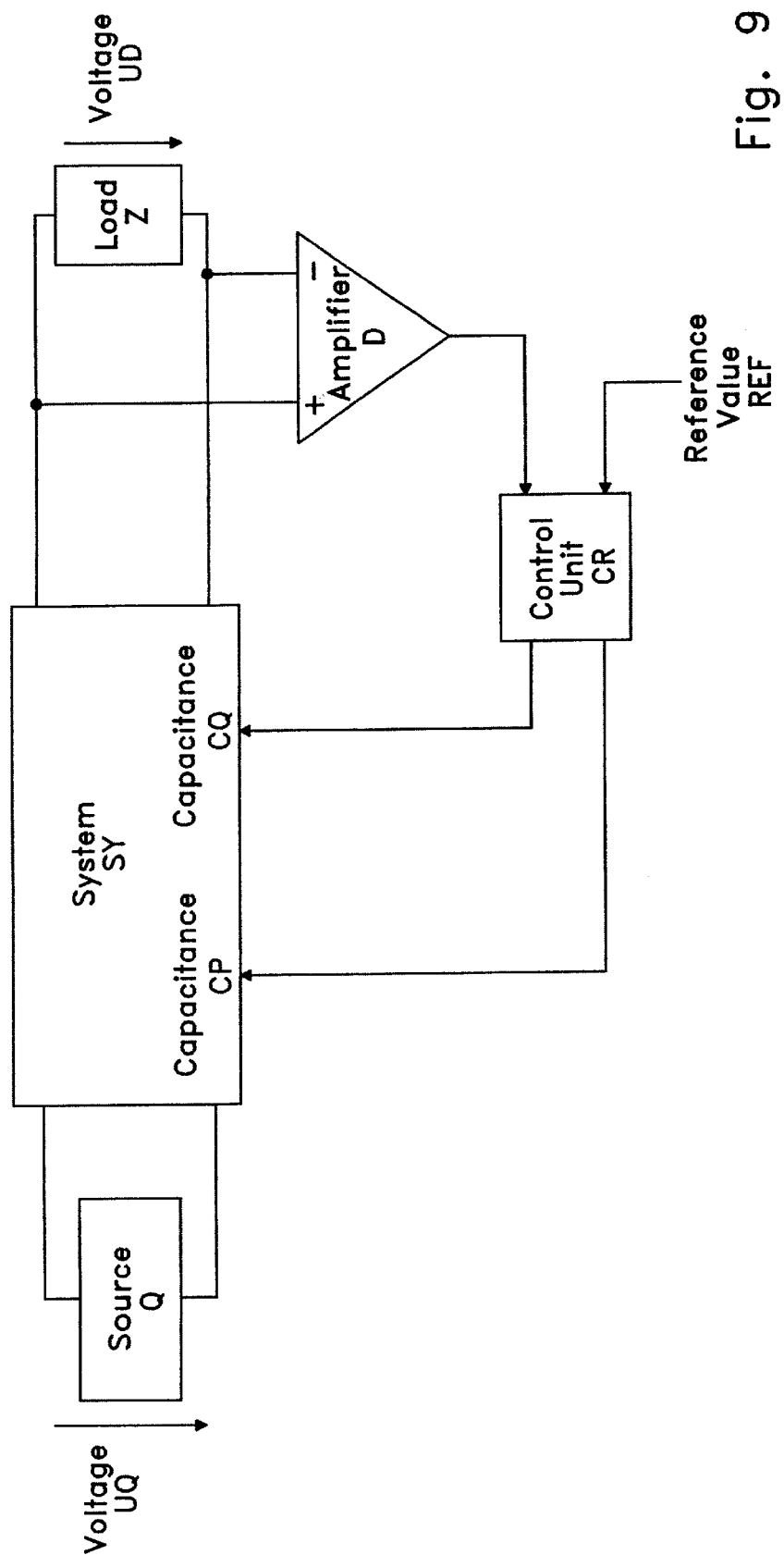

The present invention will be further explained with reference to examplified embodiments which are shown in drawings. There is shown in:

FIG. 1 an apparatus according to the present invention to generate supply voltages which apparatus is schematically represented in a block diagram;

FIG. 2 a first embodiment of the present invention according to FIG. 1;

FIG. 3 a second and further developed embodiment according to FIG. 2;

FIG. 4 an embodiment of the present invention in which a conductance is used as energy transfer element comprised in an electro-acoustic converter;

FIG. 5 a time course of switching states which occur in the embodiment according to FIG. 4;

FIG. 6 a further embodiment of the present invention represented in FIG. 4;

FIGS. 7a to 7c time courses of different currents in the circuit arrangement according to FIG. 6; and FIGS. 8a and 8b an embodiment of the invention based on the principle of capacitive voltage conversion; and FIG. 9 a closed-loop control unit to adapt to a changing source voltage.

In FIG. 1, a block diagram of an apparatus according to the present invention to generate one or several supply voltages is represented, which apparatus comprises a source Q which is, for example, a battery, a control unit CTRL, several switching elements S1 to Sn, energy transfer elements EUE, energy storing units ES and a load Z which symbolically represents the rest of a hearing device supplied by electrical energy. The control unit CTRL comprises the control and observation centre of the apparatus according to the invention. In this control unit the source voltage UQ supplied by the source Q, the energy stored in the energy transfer elements EUE and in the energy storing units SE and the supply voltages across the load Z respectively the supply currents through load Z are observed. On grounds of this information and on grounds of the reference value REF supplied to the control unit CTRL, the control unit CTRL is taking effect on the switching elements S1 to Sn of which states the supply voltages respectively the supply currents are adjusted to the desired values.

Starting from the simplified assumption that only one supply value is generated, the switching elements S1 to Sn are basically divided up into two groups, whereas one group is used to load the energy transfer elements EUE with energy supplied by the source Q and whereas the other switching group is used to transfer the energy stored in the energy transfer elements EUE to the energy storing elements SE such that the desired supply value over the load Z respectively through the load Z will be obtained.

If several supply values are to be generated, the number of switching groups is increased accordingly. If, for example, three supply values are necessary, four switching groups, for example, are required: a first switching group is used to supply energy to the energy transfer elements EUE; the further switching groups are accordingly used to distribute the energy stored in the energy transfer elements EUE to the different energy storing elements SE. It is obvious that also more than four switching groups can be used in the above mentioned case.

For the exact adjustment of the desired supply values, a reference value REF is supplied to the control unit CTRL on grounds of which reference value REF the control unit CTRL is having impact on the switching elements S1 to Sn in a controlling manner. The generation of the reference value REF is sufficiently known and is, for example, disclosed in the paper by Marc G. R. Degrauwe et al. with the title "CMOS Voltage References Using Lateral Bipolar Transistors" (IEEE Journal of solid-state circuits, Vol. SC-20, No. 6, December 1985).

FIG. 2 shows a first embodiment of the inventive general case represented in FIG. 1. This embodiment comprises a source Q, an inductance L, two switching elements S1 and S2, a condensator GC and a control unit CTRL, whereas the switching element S1, on the one hand, is switched parallel to the serial connection of the source Q and the inductance L and, on the other hand, parallel to the serial connection of the switching element S2 and of the condensator GC. The desired supply voltage UD is obtained across the condensator GC, whereas the supply voltage UD, for the exact adjustment, is fed to the control unit CTRL to generate the necessary switching states of the switching elements S1 and S2. A reference value REF is further supplied to the control unit CTRL—as already mentioned describing FIG. 1. If, according to the represented embodiment, a voltage, namely the supply voltage UD, is controlled, the reference value REF is supposed to be a voltage value. With that, a measure for the deviation of the momentary and the desired supply voltage UD can be obtained by taking the difference between the momentary supply voltage UD and the reference voltage. On grounds of these results, switching signals SS1 and SS2 for the adjustment of the switching states of the switching elements S1 and S2 are determined in the control unit CTRL. This can be done in a known manner by a pulse width modulator.

On account of completeness, it is mentioned that also a known loop filter is comprised in the control unit CTRL besides the pulse width modulator, which loop filter accordingly contributes to the overall transfer function of the system, especially in relation to its stability and to its control behaviour.

For the generation of any supply voltage UD, which can also have a higher value as the source voltage UQ, a current IL through the inductance L will firstly be obtained by a closed switching element S1 and an opened switching element S2. After a certain time, the switching element S2 will be closed and the switching element S1 will be opened, whereby the current IL will flow in the same direction, but now towards the condensator GC and the load Z, whereby across these a supply voltage UD will be built up. The value of the supply voltage UD is adjusted by a corresponding sample ratio between the two switching elements S1 and S2. For the adjustment of a desired supply voltage UD, the momentary voltage UD is measured, as mentioned, and fed to the control unit CTRL, through which the control loop is closed.

In FIG. 3, a principle circuit arrangement of a further embodiment of the present invention is represented, whereas for this embodiment several supply voltages UD1 to UD3 are generated starting from a source Q and a single inductance L used as energy transfer element. The switching arrangement is basically the same as the one represented in FIG. 2. Nevertheless, an interval, during which the switching element S2 represented in FIG. 2 is closed, is partitioned for the three switching elements S2$a$, S2$b$ and S2$c$. Capacitors GC1, GC2 and GC3 hold the different supply voltages UD1, UD2 and UD3 on the desired values. Accordingly, also the control unit CTRL represented in FIG. 2 is adjusted to this embodiment, whereby basically two variants are proposed:

A first variant comprises, for each control loop, that means for each desired supply voltage UD1 to UD3, a control unit of the described manner comprising an amplification unit, a loop filter and a pulse width modulator. In this embodiment, switching signals for the switching element S1 and the switching signals SS2$a$, SS2$b$ and SS2$c$, respectively, are generated by each pulse width modulator. For this reason, a multiplexer is provided in the control unit CTRL, to which the three switching signals for the switching element S1 are connected, whereby of these three switching signals that one is connected to the output SS1 of the control unit CTRL which belongs to the respective active switching part.

As the expenditure for the realization of the above described variant is relatively high, the second variant is preferred which is characterized in having only one control unit CTRL—as represented in FIG. 3—, whereas the control unit CTRL operates in a time multiplexed manner.

With that, the very important criterion of circuit integration on a small space is taken into account for the present usage of hearing devices. A condition for this embodiment is also that measures are taken in the control unit CTRL to render possible the holding of the control information during the two sample cycles in which the respective control loop is not active.

In FIG. 4, a further embodiment of the present invention is represented, whereas this embodiment is especially preferred in the light of the present use as voltage supply circuit for hearing devices, since, instead of the inductance taking effect as an energy transfer element, an inductance which is anyway provided by the electro-acoustic converter, i.e. loudspeaker, is used as energy transfer element. With that, the switching expenditure for the hearing device is further decreased.

A corresponding simplified circuit concept for the transfer of energy at low frequencies is represented in FIG. 4 and will be explained in the following:

It already has been proposed to reproduce audio signals by means of pulse width modulation in an amplified manner. In that proposition, an electro-acoustic converter K is arranged in a bridge circuit according to FIG. 4, whereas the bridge circuit comprises four switching elements B1 to B4 and an electro-acoustic converter K. This new method and the corresponding apparatus is subject of the U.S. patent application with the Ser. No. 08/635153 (application date Apr. 23, 1996), which content is herewith incorporated by reference.

Besides the known switching arrangement described in the above referenced application, the switching arrangement represented in FIG. 4 comprises a further switching element S1 and a condensator GC, whereas these elements are incorporated into the switching arrangement represented in FIG. 4 corresponding to the facts given along with FIGS. 2 and 3. The two last mentioned elements render possible the use of the inductance of the electro-acoustic converter K as energy transfer element according to the present invention, whereas a part of a basic sample period T, which is normally used to transfer the audio signal, is used for the energy supply of the hearing device. This will be explained along with FIG. 5 in which the basic sample period T is given, of which a part, namely during the time section TS, is used for the energy supply of the hearing device.

During the time section TS, the two switches B1 and S1 are closed and the switches B2 to B4 are opened, such that the DC current component of the current IL, which flows through the electro-acoustic converter K and which is superimposed to the audio signal, flows towards condensator GC, through which a supply voltage UD across the load Z is built up, respectively is held.

The supply voltage UD is again controllable through the selection of the value for the time section TS and for the value of the DC current component in the current IL. For this reason, this method is called "energy transfer method at low frequencies".

In addition, it should be mentioned that the switching arrangement described along with FIG. 3 for the generation of several supply voltages UD1 to UD3 can also be combined with the embodiment described along with FIG. 4 of the present invention.

In FIG. 6, a further embodiment of the present invention is represented, of which also the electro-acoustic converter K, i.e. the loudspeaker, is used as energy transfer element. Thereby—and as difference to the embodiment described along with FIG. 4—, the energy transfer is performed at high frequencies, considering the energy transfer through the electro-acoustic converter, whereas, under the term high frequencies, frequency values are understood which are higher than frequency components of the audio signal. For this reason, this method is called "energy transfer at high frequencies".

As a difference in relation to the embodiment according to FIG. 4, an additional switching element S2 is provided in the embodiment according to FIG. 6, which switching element S2 is connected parallel to the serial connection of the electro-acoustic converter K and the switching element S1. Therefore, an energy transfer from the source Q to the load Z using a special, yet to describe switching strategy becomes possible in a higher frequency range as the one in which audio signals are contained. Furthermore, it is avoided that the signal components of the energy transfer are audible.

Also for this further embodiment of the present invention, the energy transfer is performed in a time section TS of each basic sample period T. For the following explanations, it is assumed in first order approximation and for the sake of simplicity that the time section TS is so short, respectively the condensator GC is so great that the supply voltage UD and the source voltage UQ are constant in the time section TS. Furthermore, it is assumed that the electro-acoustic converter K, respectively its inductance, leads a current $I_{audio}$ at the beginning of the time section TS.

Under the above mentioned conditions, time courses of the current IL through the inductance, of the source current IQ and of the load current ILC (FIG. 6) are drawn in FIGS. 7a to 7c. The represented time courses are limited to the time section TS which is relevant for the energy transfer and which, as mentioned, only takes a part of the basic sample period T. In all time courses, four phases P1 to P4 are recognizable during which the switching states of the switching elements S1, S2 and B1 to B4 remain unchanged. The switching states only change at the phase transitions according to the following switching rhythm:

In the phase P1 both switching elements B1 and B4 are closed with which the electro-acoustic converter K is connected in parallel to the source voltage UQ. From that it follows that the current IL through the electro-acoustic converter K increases proportionally to the source voltage UQ.

At the beginning of phase P2, the switching element B4 will be opened and the switching element S1 closed. With that both switching elements B1 and S1 are closed during the phase P2 and therefore—under the assumption that the supply voltage UD is greater than the source voltage UQ—the current IL through the electro-acoustic converter K will decrease proportionally to the voltage difference between the supply voltage UD and the source voltage UQ.

At the beginning of phase P3, the switching elements B1 and S1 are opened and the switching elements B2 and B3 closed. With that the source voltage UQ now lies— nevertheless in opposite direction compared to the phase P1—across the electro-acoustic converter K. Through the opposite polarity of the voltage across the electro-acoustic converter K, also the current IL decreases through the converter. In fact, the current IL decreases in this phase P3 with the same slope as it increased in phase P1.

In phase P4, the switching element S2 is closed instead of switching element B2. The current IL through the electro-acoustic converter K increases—under the same mentioned condition that the source voltage UQ is smaller than the supply voltage UD—by the same slope as the decrease has taken place in phase P2.

From the described phases P1 to P4, together with the mentioned switching states of the switching elements S1, S2 and B1 to B4, the further relevant current courses represented in FIGS. 7b and 7c can be deduced:

In FIG. 7b the course of the source current IQ is represented, whereas it can be seen that the source current IQ in the phases P1 and P2 has the same sign as the current IL through the electro-acoustic converter K. In the phases P3 and P4, the sign of the source current IQ is changing in relation to the current IL through the electro-acoustic converter K.

Finally, in FIG. 7c the course of the loading current ILC is represented, whereas for the sake of simplicity one starts from the fact that a current flowing through the load Z can be neglected in comparison to the charge current into the condensator GC.

From FIG. 7c it can be seen that the loading current ILC in the phases P1 and P3 is equal to zero. In the phases P2 and P4 the charge transferred to the condensator GC can be determined by calculating the area under the time course for the charge current ILC, whereas in each of the phases P2 and P4 two components are recognizable. A first component is produced by the current $I_{audio}$, under which, in phase P2, an area A and in phase P4 an area −A can be recognized. Considering the whole time section TS, it can be said that the current $I_{audio}$ does not perform anything to the charge current ILC. A second component is marked in the phases P2 and P4 by the area TC. It can be seen that—overall—, i.e. over the time section TS, a charge proportional to twice the area TC is transferred to the condensator GC.

In summary, it can be said that a charge transfer to the condensator GC can be performed independently of the audio signal, that no DC current increase of the audio signal takes place and that no charge change in relation to the electro-acoustic converter K is performed. From that it follows that the electro-acoustic converter K can be used as audio transducer as well as energy transfer element without a mutual influence.

In the sense of the present invention described along with FIG. 1, a further embodiment represented in FIG. 8 has been developed. Instead of an inductance, only capacities are used as energy transfer elements. At most—as already can be seen from FIG. 8—networks of capacities are used as energy transfer elements. As has been already described along with FIGS. 2 to 7, the energy transfer is also performed in two cycles, whereas in a first cycle energy is stored in an energy transfer element and, in a second cycle, this energy is transferred to the energy storing element. These two cycles are represented in FIGS. 8a and 8b.

For the embodiment according to FIG. 8, the topology for the chosen condensator networks in the mentioned two cycles is mainly responsible for the desired source voltage UD at the output of the switching arrangement.

In FIG. 8, a switching arrangement is represented with which especially those supply voltages UD are obtained that result in a non-integer multiple of the source voltage UQ. The embodiment represented in FIG. 8 comprises a condensator GC as energy storing element (FIG. 1), six capacities C1 to C6 and a number of not represented switching elements which perform the topology change of the capacity network consisting of the capacities C1 to C6 from the network represented in FIG. 8a to the network represented in FIG. 8b. For the sake of simplicity, the capacities C1 to C6 have equal values.

As mentioned above, the switching arrangement operates in two phases:

In the first phase, the charge phase, the switching elements are brought into a state that a capacity network is created according to the one represented in FIG. 8a. In a stationary state, a voltage with the value UQ/3 is obtained across each of the capacities C1 to C6.

At the beginning of the second phase, the energy transfer phase, the switching states of the switching elements are changed in such a manner that the switching arrangement of FIG. 8b is obtained. During this phase, either the switching element S1 or S2 is closed in addition. If the switching element S1 is closed, the supply voltage UD=UQ*(1+⅔) will be obtained at the condensator GC. If the switching element S2 is closed, the supply voltage UD=UQ*⅔ will be obtained at the condensator GC.

In general, several possibilities exist to connect the capacities in the two phases. If, in the energy transfer phase, the number of the capacities connected in series, which capacities are comprised in several parallel branches, e.g., are referenced by CQ and, in the energy transfer phase, the number of capacities connected in series are referenced by CP, a supply voltage UD=UQ*(1+CP/CQ) is obtained for a closed switching element S1 and a supply voltage UD=UQ*CP/CQ is obtained for a closed switching element S2.

For the example represented in FIG. 8 having six capacities C1 to C6—supposed that all the capacities are equal—, the values for CP and CQ can be chosen from the set {1, 2, 3, 6}.

In FIG. 9, a closed-loop control circuit arrangement is represented to adapt an embodiment described along with FIGS. 8a and 8b in such a manner that a changing souce voltage does not affect the supply voltages. For that reason, a system SY comprising the energy transfer elements, the energy storing elements and the switching elements is completed by an amplifier D and a control unit CR, whereas the supply voltage UD is fed to the amplifier D which is connected to the control unit CR. In the control unit CR the values CP and CQ—as decribed along with FIGS. 8a and 8b—are calculated or taken from a look-up table, respectively, i.e. the control unit CR changes the topology of the energy transfer and energy storing elements in order to stabilize the supply voltage UD. Therefore, the supply voltage UD can be held constant although the source voltage UQ is changing. The precision of the supply voltage UD is thereby depending on the number of used capacitors, that means an increasing number of capacitors allows to exactly obtain a demanded value for the supply voltage UD.

What is claimed is:

1. A hearing aid apparatus being operable with the help of an electrical supply source, said hearing aid apparatus comprising a voltage stabiliser and an electromechanical converter, said voltage stabiliser generating, from an output voltage of said supply source, a stabilised supply voltage, said electromechanical converter comprising an electrical impedance, said electrical impedance of said electromechanical converter being part of said voltage stabiliser.

2. The apparatus of claim 1, wherein said controller is a switched controller.

3. The apparatus of claim 1 or 2, wherein said stabilised supply voltage is adjustable.

4. The apparatus of claim 1, further comprising an inductive element operationally interconnected between said source and an output of said stabiliser for said stabilised supply voltage.

5. The apparatus of claim 4, wherein said inductance includes an inductance of said electromechanical converter.

6. The apparatus of claim 1, wherein said stabiliser generates more than one stabilised output voltage.

* * * * *